United States Patent [19]
Schwan et al.

[11] Patent Number: 4,604,682
[45] Date of Patent: Aug. 5, 1986

[54] BUFFER SYSTEM FOR INTERFACING AN INTERMITTENTLY ACCESSING DATA PROCESSOR TO AN INDEPENDENTLY CLOCKED COMMUNICATIONS SYSTEM

[75] Inventors: Herbert A. Schwan; Eduard A. Schwan, both of Encinitas, Calif.

[73] Assignee: Teleplex Corporation, San Diego, Calif.

[21] Appl. No.: 430,404

[22] Filed: Sep. 30, 1982

[51] Int. Cl.⁴ .................. G06F 13/18; G06F 13/00
[52] U.S. Cl. .................. 364/200; 340/825.5
[58] Field of Search ... 364/200 MS File, 900 MS File; 340/825.03, 825.12, 825.5, 825.51

[56] References Cited

U.S. PATENT DOCUMENTS

| | | | |
|---|---|---|---|
| 3,588,825 | 6/1971 | Shook et al. | 340/163 |
| 3,636,525 | 1/1972 | Inaba et al. | 340/172.5 |
| 3,641,326 | 2/1972 | Harte | 235/151.11 |
| 3,668,653 | 6/1972 | Fair et al. | 340/172.5 |
| 3,876,984 | 4/1975 | Chertok | 340/152 |
| 3,883,851 | 5/1975 | Drake et al. | 340/172.5 |
| 4,068,297 | 1/1978 | Komiya | 364/107 |
| 4,069,488 | 1/1978 | Fiorenza et al. | 364/474 |
| 4,100,597 | 7/1978 | Fleming et al. | 364/474 |
| 4,104,731 | 8/1978 | Grudowski | 364/900 |
| 4,109,309 | 8/1978 | Johnstone et al. | 364/120 |
| 4,121,284 | 10/1978 | Hyatt | 364/200 |
| 4,122,519 | 10/1978 | Bielawski et al. | 364/200 |
| 4,132,981 | 1/1979 | White | 340/203 |
| 4,150,326 | 4/1979 | Engelberger et al. | 318/563 |
| 4,162,519 | 7/1979 | Hanewinkel | 364/200 |
| 4,209,840 | 6/1980 | Beradi et al. | 364/200 |
| 4,257,095 | 3/1981 | Nadir | 364/200 |
| 4,271,518 | 6/1981 | Birzele | 364/200 |
| 4,275,457 | 6/1981 | Leighou et al. | 364/900 |
| 4,527,233 | 7/1985 | Ambrosius, III et al. | 364/200 |

Primary Examiner—Eddie P. Chan
Attorney, Agent, or Firm—Edward W. Callan

[57] ABSTRACT

A buffer system for interfacing an intermittently accessing data processor to a communications system in which the transfer of data bits is clocked at a predetermined rate in response to clock pulses provided by a communications system clock signal. The system includes a random access memory (RAM) for storing input signal data bytes received from an input communications channel of the communications system and for storing output signal data bytes for transmission to an output communications channel of the communications system; and a port interface section that is responsive to the system clock signal for serially receiving and transmitting input signal data bytes from the input channel, for storing output signal data bytes to the output channel and for providing a flag signal to demarcate the data bytes. A transfer control signal generator responds to the flag signal by generating a sequence of transfer control signals for causing the RAM to store input signal data bytes from the port interface section, for enabling output signal data bytes stored in the RAM to be transferred to the port interface section, and for terminating the flag signal. The transfer control signal generator is adapted to respond to preemption signals provided while the RAM is accessed by the data processor by interrupting its sequential generation of transfer control signals during the interval of the preemption signal and to respond to the termination of the preemption signal by resuming said sequential generation of transfer control signals at the point of interruption.

18 Claims, 2 Drawing Figures

BUFFER SYSTEM FOR INTERFACING AN INTERMITTENTLY ACCESSING DATA PROCESSOR TO AN INDEPENDENTLY CLOCKED COMMUNICATIONS SYSTEM

BACKGROUND OF THE INVENTION

The present invention generally pertains to buffer systems for interfacing data processors to independently clocked communications systems.

Such buffer systems typically store input data for a data processor that is received over an input communications channel and/or store output data from a data processor that is to be transmitted over an output communications channel. The communications system including the input and/or output communications channels are independently clocked, thereby necessitating transfer of input and/or output signals between the buffer and the respective communications channels in predetermined sequences at the clock rate of the communications system.

On the other hand, transfer of input and/or output signals between the buffer and the data processor typically is intermittent and not synchronized with the transfer of input and/or output signals between the buffer and the communications system.

It is essential that intermittent accessing of the buffer by the data processor not disrupt the sequential transfer of input and output signals between the buffer and the communication channels.

SUMMARY OF THE INVENTION

The present invention is a buffer system that is capable of interfacing an intermittently accessing data processor to a communications system in which the transfer of data bits is clocked at a predetermined rate in response to clock pulses provided by a communications system clock signal. The buffer system of the present invention includes a random access memory (RAM) for storing input signal data bytes received from an input communications channel of the communications system and for storing output signal data bytes for transmission to an output communications channel of the communications system; a circuit connected to the RAM for connection to a data processor for enabling the data processor to access the RAM at any time to retrieve input signal data bytes from the RAM and to store output signal data bytes in the RAM, such circuit including a preemption signal generator for providing a preemption signal during the interval that the RAM is accessed by the data processor; a port interface section responsive to the system clock signal for receiving and storing input signal data bytes from the input channel, for transmitting output signal data bytes to the output channel and for providing a flag signal to demarcate the data bytes; a transfer control signal generator for responding to the flag signal by generating a sequence of transfer control signals for causing the RAM to store the input signal data bytes from the port interface section, for causing output signal data bytes stored in the RAM to be transferred to the port interface section, and for terminating the flag signal. The transfer control signal generator is adapted to respond to each preemption signal by interrupting its sequential generation of transfer control signals during the interval of the preemption signal and to respond to the termination of the preemption signal by resuming the sequential generation of transfer control signals at the point of interruption. As a result, the sequential transfer of input and output signals between the buffer system and the communications channels is not disrupted.

In some preferred embodiments, the buffer system of the present invention may be interfaced with a plurality of communications systems. Accordingly, in such embodiments, the buffer system includes a plurality of port interface sections, a switching circuit for instantaneously connecting only one port interface section to the RAM and to the output of the transfer control signal generator, and a port priority selection circuit for receiving flag signals from all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received. The port priority selection circuit is responsive to the preemption signal for causing the switching circuit to prevent connection of any of the port interface sections to the RAM during the interval that the RAM is accessed by the data processor.

In different preferred embodiments, the buffer system of the present invention is adapted to interface a data processor with only an input communications channel or with only an output communications channel respectively.

Additional features of the present invention are described in relation to the description of the preferred embodiment.

DESCRIPTION OF THE PREFERRED EMBODIMENT

Figure 1:
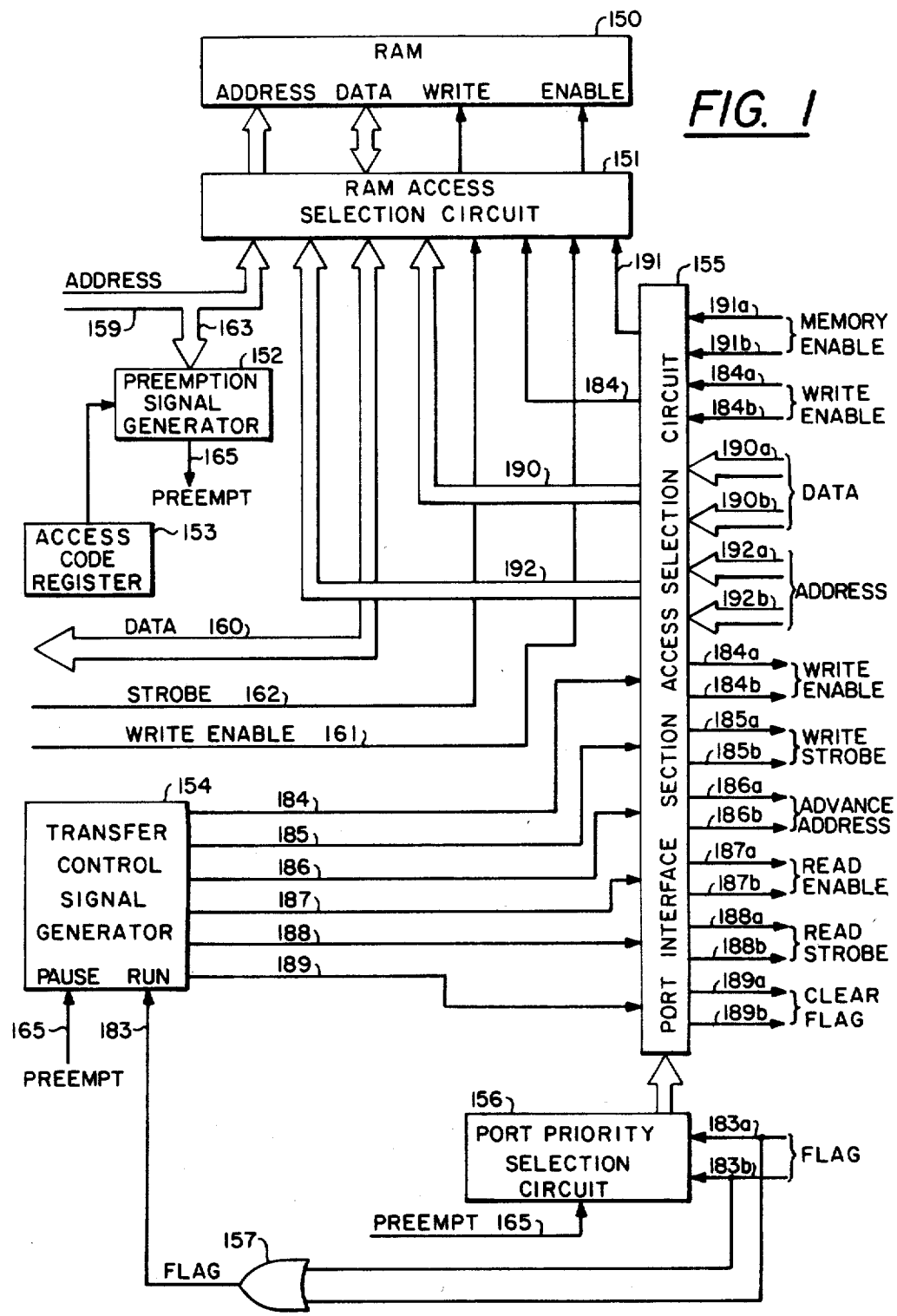
FIG. 1 is a block diagram of the portion of the buffer system of the present invention that contains the RAM and the circuits for controlling access to the RAM.

Referring to FIG. 1, a preferred embodiment of the buffer system of the present invention includes a random access memory (RAM) 150, a RAM access selection circuit 151, a preemption signal generator 152, an access code register 153, a transfer control signal generator 154, a port interface section access selection circuit 155, a port priority selection circuit 156 and an OR gate 157.

Figure 2:
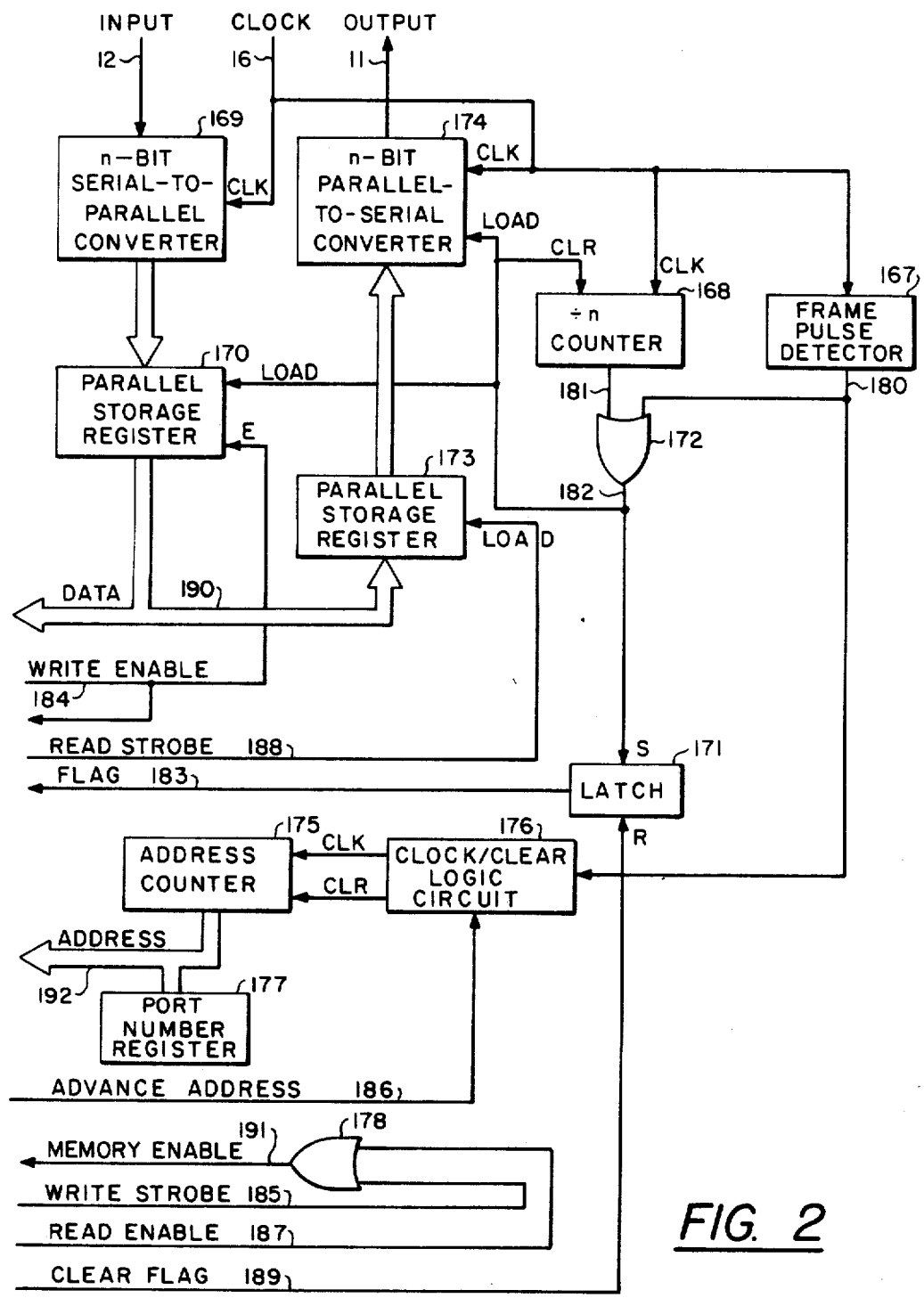
FIG. 2 is a block diagram of a port interface section included in the buffer system of the present invention.

The RAM 150 includes a first section for storing input signal data bytes received from an input communications channel of the communications system and a second section for storing output signal data bytes for transmission to an output communications channel of the communications system. Each byte includes n data bits, wherein "n" is a positive integer greater than zero. The RAM access selection circuit 151 governs access to the RAM 150 by the data processor (not shown) and by the port interface sections, such as shown in FIG. 2. Addresses for accessing the RAM 150 are provided from the data processor to the RAM access selection circuit 151 over an address bus 159. Data signals are transferred between the RAM 150 and the data processor over a data bus 160 connected to the RAM access selection circuit 151. A write enable signal for enabling the input signal data bytes stored in the RAM 150 to be retrieved by the data processor is provided from the data processor to the RAM access selection circuit 151 over the write enable line 161. A strobe signal for causing output signal data bytes from the data processor to be stored in the RAM 150 is provided from the data processor to the RAM access selection circuit 151 over the strobe line 162.

A portion of the address signal provided on address bus 159 from the data processor 159 includes an access code that is provided to the preemption signal generator 152 via a bus 163. The preemption signal generator 152 compares the access code received on bus 163 with an access code stored in the register 153 to ascertain whether the address signal received over the address bus 159 is a valid address intended for the buffer system identified by the access code stored in the register 153. When such comparison indicates that the address is valid, the preemption signal generator provides a preemption signal on line 165 during the interval that the RAM 150 is accessed by the data processor.

The port interface section access selection circuit 155 is a switching circuit for instantaneously connecting only one of a plurality of port interface sections, such as shown in FIG. 2, to the RAM 150 and to the output of the transfer control generator 154. Like-numbered lines are used in FIGS. 1 and 2 to identify the lines and busses that interconnect the port interface section access selection circuit 155 to a given port interface section. The letter suffixes (for example, 191a, 191b) to such numbers in FIG. 1 indicate the connection of the port interface section access selection circuit 155 to a plurality of port interface sections. Control of the port interface section access selection circuit 155 by the port priority selection circuit 156 is described below.

Referring to FIG. 2, a port interface section includes a frame pulse detector 167, a divide-by-n counter 168, an n-bit serial-to-parallel converter 169, a first parallel storage register 170, a latch 171, an OR gate 172, a second parallel storage register 173, an n-bit parallel-to-serial converter 174, an address counter 175, a clock/clear logic circuit 176, a port number register 177 and an OR gate 178. The port interface section of FIG. 2 is adapted to be interfaced with a telemetry system, such as described in a patent application entitled "Telemetry System for Distributed Equipment Controls and Equipment Monitors" filed by Herbert Alan Schwan, one of the coinventors herein on even date herewith. The buffer system herein both serially transmits control (output) signal data bits over an output channel 11 of the telemetry system and serially receives monitored (input) signal data bits over an input channel 12 of the telemetry system, in response to clock pulses provided by a system clock signal. The system clock signal is provided over line 16 by a clock signal generator (not shown). The clock signal further includes a frame pulse for defining each frame of clock pulses.

The frame pulse detector 167 detects the frame pulses in the system clock signal on line 16 to provide an end-of-frame signal on line 180.

The divide-by-n counter 168 counts the clock pulses in the system clock signal on line 16 to provide a byte count signal on line 181 every "nth" clock pulse. The counter 168 is reset in response to the end-of-frame signal on line 180. The lines 180 and 181 are connected to the inputs of the OR gate 172 which provide a control signal on line 182 in response to either the end-of-frame signal on line 180 or the byte count signal on line 181. Line 182 is connected to the load inputs of the first parallel storage register 170 and the n-bit parallel-to-serial converter 174, to the clear input of the counter 168 and to the set input of the latch 171.

The n-bit serial-to-parallel converter 169 serially receives an input signal data byte from the input channel 12 in response to the clock pulses of the system clock signal on line 16.

The first parallel storage register 170 is connected to the serial-to-parallel converter 169 for storing each received input signal data byte in response to either the byte count signal on line 181 or the end-of-frame signal on line 180.

The latch 171 provides a flag signal on line 183 in response to either the byte count signal on line 181 or the end-of-frame signal on line 180.

Referring again to FIG. 1, the transfer control signal generator 154 responds to the flag signal on line 183 by generating the following sequence of transfer control signals on lines 184, 185, 186, 187, 188 and 189.

A write enable signal is provided on line 184 to the first parallel storage register 170 and to the RAM 150 for enabling the input signal data byte stored in the register 170 to be written into the first section of the RAM 150 via data bus 190.

A write strobe signal is provided on line 185 to the OR gate 178 and thence to the RAM 150 as a memory enable signal via line 191 for causing the RAM 150 to store the input signal data byte provided from the first parallel storage register 170 via the data bus 190.

An advance address signal is provided on line 186 to the clock/clear logic circuit 176.

A read enable signal is provided on line 187 to the OR gate 178 and thence over line 191 as a memory enable signal to the RAM 150 for enabling an output signal data byte stored in the second section of the RAM 150 to be read therefrom.

A read strobe signal is provided over line 188 to the load input of the second parallel storage register 173.

A clear flag signal is provided on line 189 to the reset input of the latch 171 for terminating the flag signal on line 183.

The transfer control signals are provided by the transfer signal generator 154 on lines 184–189 at a rate that is sufficiently fast in relation to the rate of the system clock signal on line 16 as to complete an interrupted sequence of transfer control signals between successive clock pulses of the communications system clock signal.

The transfer control signal generator 154 is adapted to respond to each preemption signal on line 165 by interrupting its sequential generation of transfer control signals on lines 184–189 during the interval of the preemption signal and to respond to the termination of the preemption signal on line 165 by resuming the sequential generation of transfer control signals at the point of interruption.

The second parallel storage register 173 responds to the read strobe signal on line 188 by storing the output signal data byte that is read from the RAM 150 on data bus 190.

The n-bit parallel-to-serial converter 174 is connected to the second parallel storage register 173 for receiving each output signal data byte from the second parallel storage register 173 in response to either the byte count signal on line 181 or the end-of-frame signal on line 180. The n-bit parallel-to-serial converter 174 serially transmits each output signal data byte to the output channel 11 in response to the clock pulses of the system clock signal on line 16.

The address counter 175 is clocked by the clock/clear logic circuit 176 in response to each advance address signal on line 183 to provide sequentially incrementing addresses on address bus 192 to the RAM 150 for reading input signal data bytes over the data bus 190 from the first parallel storage register 170 and for writing output signal data bytes over the data bus 190 to the second storage register 173. The clock/clear logic circuit 176 responds to each end-of-frame signal on line 180 by resetting the sequentially incrementing addresses in the address counter 175 to a beginning count.

The address provided by the address counter 175 is combined with a number of address bits from a port number register 177 to identify the port interface section from which the address is derived. Although both read and write addresses are provided from the port interface section to the RAM 150 over a single address bus 192, the addresses are directed by the RAM access selection circuit 151 to either the first or second section of the RAM 150, as appropriate, in accordance with the respective states of the memory enable signal on line 191 and the write enable signal on line 184.

The port priority selection circuit 156 receives flag signals from the latches 171 of all of the port interface sections via lines 183a, 183b, . . . and responds thereto by causing the port interface section access selection circuit 155 to select only one port interface section for connection to the RAM 150 in accordance with a predetermined priority among the respective flag signals when a plurality of flag signals is received simultaneously on lines 183a, 183b, . . . , and otherwise in accordance with a priority based upon which flag signal is received first.

The port priority selection circuit 156 responds to the preemption signal on line 165 by causing the port interface section access selection circuit 155 to prevent connection of any of the port interface sections to the RAM 150 during the interval that the RAM 150 is accessed by the data processor.

We claim:

1. A buffer system for interfacing an intermittently accessing data processor to a communications system in which the transfer of data bits is clocked at a predetermined rate in response to clock pulses provided by a communications system clock signal comprising a random access memory (RAM) for storing all input signal data bytes received from an input communications channel of the communications system and for storing all output signal data bytes for transmission to an output communications channel of the communications system;

means connected to the RAM for connection to said data processor for enabling the data processor to access the RAM at any time to retrieve input signal data bytes from the RAM and to store output signal data bytes in the RAM, said connecting means including a preemption signal generator for providing a preemption signal during the interval that the RAM is accessed by the data processor;

a port interface section responsive to the system clock signal for receiving and storing an input signal data byte from the input channel, for transmitting an output signal data byte to the output channel and for providing a flag signal to demarcate the data bytes;

means responsive to each preemption signal for preventing connection of the port interface section to the RAM during the interval that the RAM is accessed by the data processor; and a transfer control signal generator for responding to the flag signal by generating the following sequence of transfer control signals:

a write enable signal provided to the port interface section for enabling the input signal data byte stored therein to be written into the RAM;

a write strobe signal provided to the RAM for causing the RAM to store the input signal data byte from the port interface section;

a read enable signal provided to the RAM for enabling an output signal data byte stored therein to be read therefrom;

a read strobe signal provided to the port interface section to cause the port interface section to read the stored output signal data byte from the RAM; and a clear flag signal provided to the port interface section for terminating the flag signal;

wherein the transfer control signal generator is connected to respond to each preemption signal by interrupting its sequential generation of transfer control signals during the interval of the preemption signal and to respond to the termination of the preemption signal by resuming said sequential generation of transfer control signals at the point of interruption.

2. A buffer system according to claim 1 for interfacing said data processor to a plurality of said communications systems, the buffer system comprising a plurality of said port interface sections corresponding in number to the plurality of communications systems;

a switching circuit for instantaneously connecting only one port interface section to the RAM and to the transfer control signal generator; and a port priority selection circuit for receiving flag signals from all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

3. A buffer system according to claim 2, wherein the port priority selection circuit is responsive to the preemption signal for causing the switching circuit to prevent connection of any of the port interface sections to the RAM during the interval that the RAM is accessed by the data processor.

4. A buffer system for interfacing an intermittently accessing data processor to a communications system in which the transfer of data bits is clocked at a predetermined rate in response to clock pulses provided by a communications system clock signal comprising a random access memory (RAM) for storing all input signal data bytes received from an input communications channel of the communications system;

means connected to the RAM for connection to said data processor for enabling the data processor to access the RAM at any time to retrieve input signal data bytes from the RAM, said connecting means including a preemption signal generator for providing a preemption signal during the interval that the RAM is accessed by the data processor;

a port interface section responsive to the system clock signal for receiving and storing an input signal data byte from the input channel and for providing a flag signal to demarcate the data bytes;

means responsive to each preemption signal for preventing connection of the port interface section to the RAM during the interval that the RAM is accessed by the data processor; and a transfer control signal generator for responding to the flag signal by generating the following sequence of transfer control signals:

a write enable signal provided to the port interface section for enabling the input signal data byte stored therein to be written into the RAM;

a write strobe signal provided to the RAM for causing the RAM to store the input signal data byte from the port interface section; and a clear flag signal provided to the port interface section for terminating the flag signal;

wherein the transfer control signal generator is connected to respond to each preemption signal by interrupting its sequential generation of transfer control signals during the interval of the preemption signal and to respond to the termination of the preemption signal by resuming said sequential generation of transfer control signals at the point of interruption.

5. A buffer system according to claim 4, for interfacing said data processor to a plurality of said communications systems, the buffer system comprising a plurality of said port interface sections corresponding in number to the plurality of communications systems;

a switching circuit for instantaneously connecting only one port interface section to the RAM and to the transfer control signal generator; and a port priority selection circuit for receiving flag signals from all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

6. A buffer system according to claim 5, wherein the port priority selection circuit is responsive to the preemption signal for causing the switching circuit to prevent connection of any of the port interface sections to the RAM and to the output of the transfer control signal generator during the interval that the RAM is accessed by the data processor.

7. A buffer system for interfacing an intermittently accessing data processor to a communications system in which the transfer of data bits is clocked at a predetermined rate in response to clock pulses provided by a communications system clock signal comprising a random access memory (RAM) for storing all output signal data bytes for transmission to an output communications channel of the communications system;

means connected to the RAM for connection to said data processor for enabling the data processor to access the RAM at any time to store output signal data bytes in the RAM, said connecting means including a preemption signal generator for providing a preemption signal during the interval that the RAM is accessed by the data processor;

a port interface section responsive to the system clock signal for transmitting an output signal data byte to the output channel and for providing a flag signal to demarcate the data bytes;

means responsive to each preemption signal for preventing connection of the port interface section to the RAM during the interval that the RAM is accessed by the data processor; and a transfer control signal generator for responding to the flag signal by generating the following sequence of transfer control signals:

a read enable signal provided to the RAM for enabling an output signal data byte stored therein to be read therefrom;

a read strobe signal provided to the port interface section to cause the port interface section to read the stored output signal data byte from the RAM; and a clear flag signal provided to the port interface section for terminating the flag signal;

wherein the transfer control signal generator is connected to respond to each preemption signal by interrupting its sequential generation of transfer control signals during the interval of the preemption signal and to respond to the termination of the preemption signal by resuming said sequential generation of transfer control signals at the point of interruption.

8. A buffer system according to claim 7, for interfacing said data processor to a plurality of said communications systems, the buffer system comprising a plurality of said port interface sections corresponding in number to the plurality of communications systems;

a switching circuit for instantaneously connecting only one port interface section to the RAM and to the transfer control signal generator; and a port priority selection circuit for receiving flag signals from all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

9. A buffer system according to claim 8, wherein the port priority selection circuit is responsive to the preemption signal for causing the switching circuit to prevent connection of any of the port interface sections to the RAM during the interval that the RAM is accessed by the data processor.

10. A buffer system for interfacing an intermittently accessing data processor to a communications system in which the transfer of data bits is clocked at a predetermined rate in response to clock pulses included in a communications system clock signal that further includes a frame pulse for defining each frame of clock pulses, comprising a random access memory (RAM) for storing input signal data bytes received from an input communications channel of the communications system and for storing output signal data bytes for transmission to an output communications channel of the communications system, wherein each byte includes n data bits, wherein "n" is a positive integer greater than zero;

means connected to the RAM for connection to said data processor for enabling the data processor to access the RAM at any time to retrieve input signal data bytes from the RAM and to store output signal data bytes in the RAM, said connecting means including a preemption signal generator for providing a preemption signal during the interval that the RAM is accessed by the data processor;

a frame pulse detector for detecting the frame pulses in the system clock signal to provide an end-of-frame signal;

a divide-by-n counter for counting the clock pulses in the system clock signal to provide a byte count signal every "nth" clock pulse, wherein the counter is reset in response to the end-of-frame signal;

an n-bit serial-to-parallel converter for serially receiving an input signal data byte from the input channel in response to the clock pulses of the system clock signal;

a first parallel storage register connected to the serial-to-parallel converter for storing each input signal data byte in response to either the byte count signal or the end-of-frame signal;

a latch for providing a flag signal in response to either the byte count signal or the end-of-frame signal;

a transfer control signal generator for responding to the flag signal by generating the following sequence of transfer control signals;

a write enable signal provided to the first parallel storage register for enabling the input signal data byte stored therein to be written into the RAM;

a write strobe signal provided to the RAM for causing the RAM to store the input signal data byte from the first parallel storage register;

an advance address signal;

a read enable signal provided to the RAM for enabling an output signal data byte stored therein to be read therefrom;

a read strobe signal; and a clear flag signal provided to the latch for terminating the flag signal;

wherein the transfer control signal generator is connected to respond to each preemption signal by interrupting its sequential generation of transfer control signals during the interval of the preemption signal and to respond to the termination of the preemption signal by resuming said sequential generation of transfer control signals at the point of interruption;

a second parallel storage register responsive to the read strobe signal for storing the output signal data byte that is read from the RAM;

an n-bit parallel-to-serial converter connected to the second parallel storage register for receiving each output signal data byte from the second parallel storage register in response to either the byte count signal or the end-of-frame signal, and for serially transmitting each output signal data byte to the output channel in response to the clock pulses of the system clock signal;

an address counter responsive to each advance address signal for providing sequentially incrementing addresses to the RAM for reading input signal data bytes from the first parallel storage register and for writing output signal data bytes to the second storage register, and further responsive to each end-of-frame signal for setting said sequentially incrementing addresses to a beginning count; and means responsive to each preemption signal for preventing connection of the parallel storage registers and the transfer control signal generator to the RAM during the interval that the RAM is accessed by the data processor.

11. A buffer system according to claim 10 for interfacing said data processor to a plurality of said communications systems, the buffer system comprising a plurality of port interface sections corresponding in number to the plurality of communications systems, wherein each port interface section includes said frame pulse detector, said divide-by-n counter, said n-bit serial-to-parallel converter, said first parallel storage register, said latch, said second parallel storage register, said n-bit parallel-to-serial converter and said address counter;

a switching circuit for instantaneously connecting only one port interface section to the RAM and to the transfer control signal generator; and a port priority selection circuit for receiving flag signals from the latches of all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

12. A buffer system according to claim 11, wherein the port priority selection circuit is responsive to the preemption signal for causing the switching circuit to prevent connection of any of the port interface sections to the RAM during the interval that the RAM is accessed by the data processor.

13. A buffer system for interfacing an intermittently accessing data processor to a communications system in which the transfer of data bits is clocked at a predetermined rate in response to clock pulses included in a communications system clock signal that further includes a frame pulse for defining each frame of clock pulses, comprising a random access memory (RAM) for storing input signal data bytes received from an input communications channel of the communications system, wherein each byte includes n data bits, wherein "n" is a positive integer greater than zero;

means connected to the RAM for connection to said data processor for enabling the data processor to access the RAM at any time to retrieve input signal data bytes from the RAM, said connecting means including a preemption signal generator for providing a preemption signal during the interval that the RAM is accessed by the data processor;

a frame pulse detector for detecting the frame pulses in the system clock signal to provide an end-of-frame signal;

a divide-by-n counter for counting the clock pulses in the system clock signal to provide a byte count signal every "nth" clock pulse, wherein the counter is reset in response to the end-of-frame signal;

an n-bit serial-to-parallel converter for serially receiving an input signal data byte from the input channel in response to the clock pulses of the system clock signal;

a parallel storage register connected to the serial-to-parallel converter for storing each input signal data byte in response to either the byte count signal or the end-of-frame signal;

a latch for providing a flag signal in response to either the byte count signal or the end-of-frame signal;

a transfer control signal generator for responding to the flag signal by generating the following sequence of transfer control signals;

a write enable signal provided to the first parallel storage register for enabling the input signal data byte stored therein to be written into the RAM;

p2 a write strobe signal provided to the RAM for causing the RAM to store the input signal data byte from the first parallel storage register;

an advance address signal; and a clear flag signal provided to the latch for terminating the flag signal;

wherein the transfer control signal generator is connected to respond to each preemption signal by interrupting its sequential generation of transfer control signals during the interval of the preemption signal and to respond to the termination of the preemption signal by resuming said sequential generation of transfer control signals at the point of interruption;

an address counter responsive to each advance address signal for providing sequentially incrementing addresses to the RAM for reading input signal data bytes from the parallel storage register, and further responsive to each end-of-frame signal for resetting said sequentially incrementing addresses to a beginning count; and means responsive to each preemption signal for preventing connection of the parallel storage register and the transfer control signal generator to the RAM during the interval that the RAM is accessed by the data processor.

14. A buffer system according to claim 13 for interfacing said data processor to a plurality of said communications systems, the buffer system comprising a plurality of port interface sections corresponding in number to the plurality of communications systems, wherein each port interface section includes said frame pulse detector, said divide-by-n counter, said n-bit serial-to-parallel converter, said n-bit serial-to-parallel converter, said parallel storage register, said latch, and said address counter;

a switching circuit for instantaneously connecting only one port interface section to the RAM and to the transfer control signal generator; and a port priority selection circuit for receiving flag signals from the latches of all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

15. A buffer system according to claim 14, wherein the port priority selection circuit is responsive to the preemption signal for causing the switching circuit to prevent connection of any of the port interface sections to the RAM during the interval that the RAM is accessed by the data processor.

16. A buffer system for interfacing an intermittently accessing data processor to a communications system in which the transfer of data bits is clocked at a predetermined rate in response to clock pulses included in a communications system clock signal that further includes a frame pulse for defining each frame of clock pulses, comprising a random access memory (RAM) for storing output signal data bytes for transmission to an output communications channel of the communications system, wherein each byte inclues n data bits, wherein "n" is a positive integer greater than zero;

means connected to the RAM for connection to said data processor for enabling the data processor to access the RAM at any time to store output data signal bytes in the RAM, said connecting means including a preemption signal generator for providing a preemption signal during the interval that the RAM is accessed by the data processor;

a frame pulse detector for detecting the frame pulses in the system clock signal to provide an end-of-frame signal;

a divide-by-n counter for counting the clock pulses in the system clock signal to provide a byte count signal every "nth" clock pulse, wherein the counter is reset in response to the end-of-frame signal;

a latch for providing a flag signal in response to either the byte count signal or the end-of-frame signal;

a transfer control signal generator for responding to the flag signal by generating the following sequence of transfer control signals;

an advance address signal;

a read enable signal provided to the RAM for enabling an output signal data byte stored therein to be read therefrom;

a read strobe signal; and a clear flag signal provided to the latch for terminating the flag signal;

wherein the transfer control signal generator is connected to respond to each preemption signal by interrupting its sequential generation of transfer control signals during the interval of the preemption signal by resuming said sequential generation of transfer control signals at the point of interruption;

a parallel storage register responsive to the read strobe signal for storing the output signal data byte that is read from the RAM;

an n-bit parallel-to-serial converter connected to the parallel storage register for receiving each output signal data byte from the parallel register in response to either the byte count signal or the end-of-frame signal, and for serially transmitting each output signal data byte to the output channel in response to the clock pulses of the system clock signal;

an address counter responsive to each advance signal for providing sequentially incrementing addresses to the RAM for writing output signal data bytes to the storage register, and further responsive to each end-of-frame signal for resetting said sequentially incrementing addresses to a beginning count; and means responsive to each preemption signal for preventing connection of the parallel storage register and the transfer control signal generator to the RAM during the interval that the RAM is accessed by the data processor.

17. A buffer system according to claim 16, for interfacing said data processor to a plurality of said communications systems, the buffer system comprising
- a plurality of port interface sections corresponding in number to the plurality of communications systems, wherein each port interface section includes said frame pulse detector, said divide-by-n counter, said latch, said parallel storage register, said n-bit parallel-to-serial converter and said address counter;
- a switching circuit for instantaneously connecting only one port interface section to the RAM and to the transfer control signal generator; and
- a port priority selection circuit for receiving flag signals from the latches of all of the port interface sections and for causing the switching circuit to select only one port interface section for connection to the RAM in accordance with a predetermined priority among the respective flag signals when a plurality of flag signals is received simultaneously, and otherwise in accordance with a priority based upon which flag signal is first received.

18. A buffer system according to claim 17, wherein the port priority selection circuit is responsive to the preemption signal for causing the switching circuit to prevent connection of any of the port interface sections to the RAM during the interval that the RAM is accessed by the data processor.

* * * * *